United States Patent
Augustin et al.

(10) Patent No.: US 11,902,129 B1
(45) Date of Patent: Feb. 13, 2024

(54) VENDOR-AGNOSTIC REAL-TIME MONITORING OF TELECOMMUNICATIONS NETWORKS

(71) Applicant: T-Mobile USA, Inc., Bellevue, WA (US)

(72) Inventors: Raja Joseph Augustin, Fords, NJ (US); Shawn P. Burkit, Whitehall, PA (US); Yaqing Guo, Sammamish, WA (US); Brett Hadden, Maple Valley, WA (US); Jason R. Hood, Snoqualmie, WA (US); Yun Hong Lee, Stafford, TX (US); Sanath Raj, Snoqualmie, WA (US); Saikumaar Venkatasubramaniam, Short Hills, NJ (US); Krishna K. Vennamaneni, Richardson, TX (US); Daniel F. Villa, Bellevue, WA (US); Zhijian Wu, Frisco, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/190,009

(22) Filed: Mar. 24, 2023

(51) Int. Cl.
*H04L 43/0817* (2022.01)
*H04L 41/22* (2022.01)

(52) U.S. Cl.
CPC .......... *H04L 43/0817* (2013.01); *H04L 41/22* (2013.01)

(58) Field of Classification Search
CPC ..... H04L 43/0817; H04L 43/00; H04L 43/02; H04L 43/06; H04L 43/065; H04L 41/022
See application file for complete search history.

(56) References Cited

U.S. PATENT DOCUMENTS

| | | | |
|---|---|---|---|
| 4,545,011 | A | 10/1985 | Lyon et al. |
| 4,856,047 | A | 8/1989 | Saunders |
| 5,410,723 | A | 4/1995 | Schmidt et al. |
| 5,724,575 | A | 3/1998 | Hoover et al. |
| 6,006,206 | A | 12/1999 | Smith et al. |

(Continued)

FOREIGN PATENT DOCUMENTS

| | | |
|---|---|---|
| CN | 208461850 U | 2/2019 |
| CN | 110083102 A | 8/2019 |

(Continued)

*Primary Examiner* — Jonathan A Bui
(74) *Attorney, Agent, or Firm* — Perkins Coie LLP

(57) ABSTRACT

A method for vendor-agnostic processing of data for monitoring a real-time operational status of a telecommunications network includes routing cell site status indications from a broker node to an in-memory processing engine. The cell site status indications are based on parameter data. A first application of the in-memory processing engine generates unique identifiers that associate each cell site status indication to a particular cell site identification code and generate feedback for the broker node including modified cell site status indications including the unique identifiers. The broker node forwards the modified cell site status indications to a second application of the in-memory processing. The second application processes the modified broker messages to extract the second parameter data from the modified cell site status indications. The in-memory processing engine generates a dataset including the second parameter data associated with the unique identifiers by the in-memory processing engine.

20 Claims, 5 Drawing Sheets

(56) References Cited

U.S. PATENT DOCUMENTS

| | | | |
|---|---|---|---|
| 6,026,306 A | 2/2000 | Foladare et al. | |
| 6,289,010 B1 * | 9/2001 | Voit | H04L 65/104 379/91.01 |
| 6,304,497 B1 | 10/2001 | Roohparvar | |
| 6,408,172 B1 | 6/2002 | Alperovich et al. | |
| 6,423,016 B1 | 7/2002 | Hamilton et al. | |
| 6,611,740 B2 | 8/2003 | Lowrey et al. | |
| 6,633,899 B1 | 10/2003 | Coward | |
| 6,795,689 B1 | 9/2004 | Oegren et al. | |
| 6,980,963 B1 | 12/2005 | Hanzek | |
| 7,080,144 B2 | 7/2006 | Boehmke | |
| 7,120,688 B1 | 10/2006 | Nguyen et al. | |
| 7,200,651 B1 | 4/2007 | Niemi | |
| 7,233,998 B2 | 6/2007 | Suzuoki et al. | |
| 7,315,744 B2 | 1/2008 | Achour | |
| 7,379,420 B2 | 5/2008 | Elbourne et al. | |
| 7,870,439 B2 | 1/2011 | Fujiyama et al. | |
| 7,970,585 B2 | 6/2011 | Van et al. | |
| 8,005,510 B2 | 8/2011 | Fischer | |
| 8,126,991 B2 | 2/2012 | Smith et al. | |
| 8,260,900 B2 | 9/2012 | Morrison et al. | |
| 8,352,197 B2 | 1/2013 | Rantala et al. | |
| 8,395,652 B1 | 3/2013 | Chapweske et al. | |
| 8,625,572 B2 | 1/2014 | Wirola et al. | |
| 9,749,882 B2 | 8/2017 | Pelletier | |
| 9,847,926 B2 | 12/2017 | Couture et al. | |
| 9,852,437 B2 | 12/2017 | Spaeth et al. | |
| 9,886,338 B1 | 2/2018 | Khokhar et al. | |
| 9,955,377 B2 | 4/2018 | Uchino et al. | |
| 10,097,630 B2 | 10/2018 | Markus | |
| 10,301,923 B2 | 5/2019 | Andresen et al. | |
| 10,592,326 B2 | 3/2020 | Winokur | |
| 10,708,213 B2 | 7/2020 | Garlick et al. | |
| 11,015,577 B2 | 5/2021 | Son et al. | |
| 11,200,774 B2 | 12/2021 | Erestam | |
| 11,252,681 B1 | 2/2022 | Marupaduga | |
| 2002/0038282 A1 | 3/2002 | Montgomery | |
| 2005/0146606 A1 | 7/2005 | Karsenty et al. | |
| 2005/0209892 A1 | 9/2005 | Miller | |
| 2007/0214074 A1 | 9/2007 | Friedland et al. | |
| 2008/0059941 A1 | 3/2008 | Payne et al. | |
| 2009/0075663 A1 | 3/2009 | Wilson | |
| 2011/0037764 A1 | 2/2011 | Saleem | |
| 2012/0185197 A1 | 7/2012 | Lorden et al. | |
| 2016/0043814 A1 | 2/2016 | Bishop | |
| 2021/0022016 A1 * | 1/2021 | Lee | H04W 24/04 |
| 2021/0152446 A1 | 5/2021 | Lessmann et al. | |
| 2022/0038907 A1 | 2/2022 | Shaw | |
| 2022/0222067 A1 | 7/2022 | Courtney et al. | |

FOREIGN PATENT DOCUMENTS

| | | |
|---|---|---|
| CN | 111092620 A | 5/2020 |
| CN | 108391448 B | 6/2022 |
| DE | 10217856 B4 | 11/2006 |
| DE | 102012015749 A1 | 2/2013 |
| DE | 102017212851 A1 | 2/2018 |
| DE | 102020117609 B4 | 1/2022 |
| EP | 0232198 A1 | 8/1987 |
| EP | 0287334 A2 | 10/1988 |
| EP | 1066573 A1 | 1/2001 |
| EP | 1080436 A2 | 3/2001 |
| EP | 1128628 A1 | 8/2001 |
| EP | 1131947 A1 | 9/2001 |
| EP | 1142372 A1 | 10/2001 |
| EP | 1397889 A2 | 3/2004 |
| EP | 1581658 A1 | 10/2005 |
| EP | 1889160 A2 | 2/2008 |
| EP | 2127124 A2 | 12/2009 |
| EP | 2471243 A1 | 7/2012 |
| EP | 2814202 A1 | 12/2014 |
| EP | 3152661 A1 | 4/2017 |
| EP | 3273652 A1 | 1/2018 |
| EP | 2915357 B1 | 7/2018 |
| EP | 3504714 A1 | 7/2019 |
| EP | 3644178 A1 | 4/2020 |
| JP | 2015535965 A | 12/2015 |
| JP | 5866348 B2 | 1/2016 |
| JP | 2017531556 A | 10/2017 |
| JP | 6512788 B2 | 4/2019 |
| KR | 20040062532 A | 7/2004 |
| KR | 100697338 B1 | 3/2007 |
| KR | 100892074 B1 | 4/2009 |
| WO | 9845728 A1 | 10/1998 |
| WO | 0161593 | 8/2001 |
| WO | 0215057 A1 | 2/2002 |
| WO | 0229508 A2 | 4/2002 |
| WO | 2004044691 A2 | 5/2004 |
| WO | 2004075024 A2 | 9/2004 |
| WO | 2006040560 A1 | 4/2006 |
| WO | 2007022093 A2 | 2/2007 |
| WO | 2007084409 A2 | 7/2007 |
| WO | 2008142033 A1 | 11/2008 |
| WO | 2009043020 A2 | 4/2009 |
| WO | 2009142511 A1 | 11/2009 |
| WO | 2010032262 A2 | 3/2010 |
| WO | 2011103652 A1 | 9/2011 |
| WO | 2011146785 A1 | 11/2011 |
| WO | 2015057187 A1 | 4/2015 |
| WO | 2016137015 A1 | 9/2016 |
| WO | 2020127467 A1 | 6/2020 |
| WO | 2021046366 A1 | 3/2021 |

* cited by examiner

VENDOR-AGNOSTIC REAL-TIME MONITORING OF TELECOMMUNICATIONS NETWORKS

BACKGROUND

Telecommunications network service providers have an interest in monitoring the operational status of their network in real time. Such monitoring includes identifying any cell sites or cell site sectors having partial or full network outage issues as soon as possible. Real-time monitoring is required for the efficient distribution of recovery resources and execution of any recovery operations.

Operations support systems (OSSs) are software programs configured for monitoring, managing, and analyzing telecommunications networks. Telecommunications service providers rely on data collected from the OSSs in determining the operational statuses of cell sites and cell site sectors of a network. The OSSs are generally operated by contracting vendors that are different from the telecommunications service providers.

BRIEF DESCRIPTION OF THE DRAWINGS

Detailed descriptions of implementations of the present technology will be described and explained through the use of the accompanying drawings.

Figure 1:
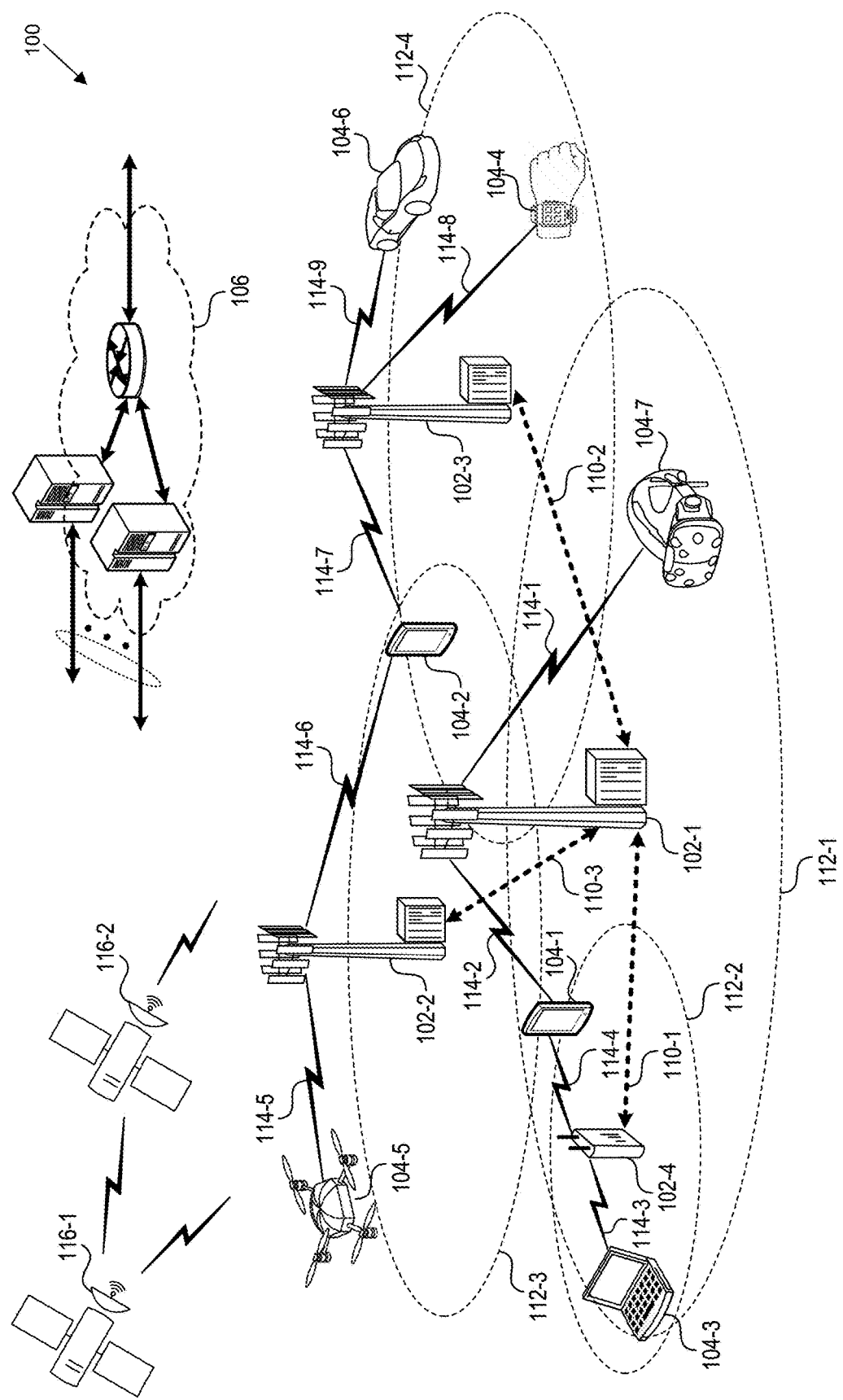
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The present technology relates to the vendor-agnostic processing of data collected from a variety of devices and/or systems for monitoring a real-time operational status of a telecommunications network. Operational statuses of cell sites in a telecommunications network are monitored by OSSs from multiple different vendors (e.g., parties that operate and manage OSSs that are separate from the service provider associated with the telecommunications network). The data describing the operational statuses received from the OSSs can be in different formats that are incompatible with each other. The different formats make it challenging to collect comprehensive status data for large geographical areas (e.g., multiple states or nationwide). The present technology can include a system including a broker node (e.g., a Kafka broker) and an in-memory processing engine (e.g., an Apache Spark server) in communication with each other for routing and processing cell site status indications received from multiple OSSs. The system can generate a dataset including parameter data associated with cell site status indications associated with unique identifiers associated with different cell sites and/or different cell site sectors. Based on the dataset, a collective representation of the real-time operational status of the telecommunications network can be displayed.

In one implementation, a method can include receiving cell site status indications configured as broker messages at a broker node from a cell site status collector. The cell site status indications can be received in different formats at different OSSs of the telecommunications network. The cell site status indications can be based on parameter data describing operational statuses of cell sites of respective OSSs. The parameter data can include first parameter data having cell site identification codes for particular cell sites and second parameter data for the particular cell sites. The method can include routing the cell site status indications configured as broker messages from the broker node to an in-memory processing engine. The in-memory processing engine includes multiple software applications including a first software application and a second software application. The method can include generating unique identifiers that associate each cell site status indication to a particular cell site identification code by the first software application of the in-memory processing engine. The first parameter data of the cell site status indications can be extracted from the cell site status indications. The method can include causing the first software application of the in-memory processing engine to generate feedback for the broker node including modified cell site status indications. The modified cell site status indications can include the unique identifiers. The method can include forwarding the modified cell site status indications by the broker node to the second software application of the multiple software applications of the in-memory processing engine as modified broker messages. The method can include processing the modified broker messages to extract the second parameter data from the modified cell site status indications by the second software application. The method can include generating a dataset that includes the second parameter data associated with the unique identifiers by the in-memory processing engine. The dataset can enable monitoring of the real-time operational status of the telecommunications network.

In another implementation, a method can include routing cell site status indications configured as broker messages from a broker node to an in-memory processing engine. The cell site status indications can be based on parameter data describing operational statuses of cell sites associated with the telecommunications network. The parameter data can include first parameter data having cell site identification codes for particular cell sites and second parameter data for the particular cell sites. The in-memory processing engine can include multiple software applications including a first software application and a second software application. The method can include generating unique identifiers that associate each cell site status indication to a particular cell site identification code by the first software application of the in-memory processing engine. The first parameter data of the cell site status indications can be extracted from the cell site status indications. The method can include causing the first software application of the in-memory processing engine to generate feedback for the broker node including modified cell site status indications. The modified cell site status indications can include the unique identifiers. The method can include forwarding the modified cell site status indications by the broker node, to the second software application of the multiple software applications of the in-memory processing engine as modified broker messages. The method can include processing the modified broker messages to extract the second parameter data from the modified cell site status indications by the second software application. The method can also include generating a dataset that includes the second parameter data associated with the unique identifiers by the in-memory processing engine. The dataset can enable monitoring of the operational status of the telecommunications network.

In yet another implementation, the techniques described herein relate to a system including a broker node and an in-memory processing engine. The system is configured for vendor-agnostic processing of data for monitoring a real-time operational status of a telecommunications network. The system can receive cell site status indications configured as broker messages at the broker node from a cell site status collector. The cell site status indications can be received in different formats at different OSSs of the telecommunications network. The cell site status indications can be based on parameter data describing operational statuses of cell sites of respective OSSs. The parameter data can include first parameter data having cell site identification codes for particular cell sites and second parameter data for the particular cell sites. The system can route the cell site status indications configured as broker messages from the broker node to an in-memory processing engine. The in-memory processing engine includes multiple software applications including a first software application and a second software application. The system can generate unique identifiers that associate each cell site status indication to a particular cell site identification code by the first software application of the in-memory processing engine. The first parameter data of the cell site status indications can be extracted from the cell site status indications. The system can cause the first software application of the in-memory processing engine to generate feedback for the broker node including modified cell site status indications. The modified cell site status indications can include the unique identifiers. The system can forward the modified cell site status indications by the broker node to the second software application of the multiple software applications of the in-memory processing engine as modified broker messages. The system can process the modified broker messages to extract the second parameter data from the modified cell site status indications by the second software application. The system can generate a dataset that includes the second parameter data associated with the unique identifiers by the in-memory processing engine. The dataset can enable monitoring of the real-time operational status of the telecommunications network.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

Real-Time Monitoring of a Telecommunications Network

Figure 2:
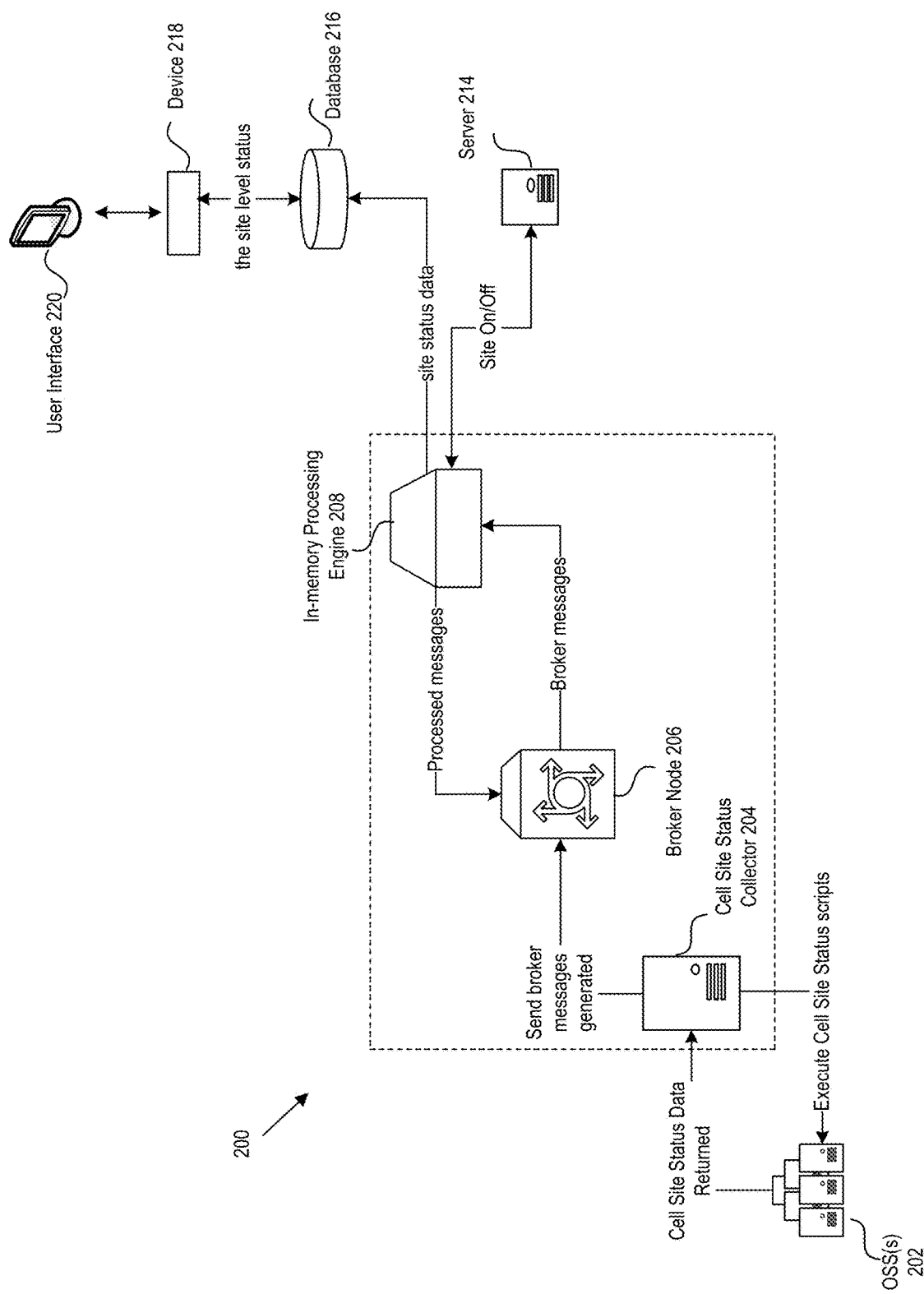
FIG. 2 is a block diagram that illustrates a real-time telecommunications network monitoring system.

FIG. 2 is a block diagram that illustrates a real-time telecommunications network monitoring system 200. The system 200 is configured to receive data describing statuses of cell sites of a telecommunications network (e.g., the base stations 102) from OSSs associated with the network (e.g., OSSs 202) and process the data to form a database that includes a collective data describing a status of the network (e.g., over a geographical area or a particular technology). The system 200 is configured as agnostic, meaning that the format or the source of the data to be processed is irrelevant. Instead, the system 200 can be used to monitor the telecommunications network with data collected from a variety of systems and/or vendors. The system 200 includes a cell site status collector 204, a broker node 206, and an in-memory processing engine 208. The system can further include, or be in communication with, an additional server 214 and a database 216.

The cell site status collector 204 (e.g., a Kafka producer) includes a computer module or a cluster of computer modules that are configured to collect data (e.g., metrics) from multiple OSSs (e.g., the OSSs 202) and process the data so that it can be forwarded to further processing by the system 200. The data includes cell site status indications from cell sites managed by the OSSs 202. In some implementations, the cell site status collector 204 is configured to send scripts to the OSSs 202 that include instructions for providing the data. In response to executing the received scripts, the OSSs 202 return the data to the cell site status collector 204. The cell site status collector 204 can further configure the data, including the cell site status indications, as broker messages. Configuring the cell site status indications as broker messages can refer to converting the cell site status indications in a format that enables the transfer of the cell site status indications between a variety of software applications and/or servers. In particular, the cell site status collector 204 can be configured to send the cell site status indications that are configured as broker messages to the broker node 206.

The broker node 206 (e.g., a Kafka broker or a message broker) includes a module or a cluster of modules that operates software tools for facilitating communication and information exchange within the system 200. In particular, the broker node 206 is configured to facilitate the transfer of broker messages between the cell site status collector 204 and the in-memory processing engine 208. The broker node 206 can, for example, receive the cell site status indications that are configured as broker messages from the cell site status collector 204 and forward them to the in-memory processing engine 208 for processing. Furthermore, the broker node 206 can enable multiple rounds of processing by the in-memory processing engine 208. For example, the broker node 206 can receive processed broker messages from the in-memory processing engine 208 after a round of processing and forward them back to the in-memory processing engine 208 for further processing. Such looping of the processed broker messages can be repeated multiple times.

In some implementations, the cell site status collector 204 and/or the broker node 206 are part of an Apache Kafka streaming platform. Apache Kafka (also referred to as "Kafka") refers to a real-time data streaming technology with a distributed event store and stream processing platform developed by the Apache Software Foundation. Apache Kafka is an open-source system written in Java and Scala languages and can enable unified, high-throughput handling of real-time data transfers. For example, the broker node 206 can be a Kafka broker that is configured to allow retrieving of messages by topic (e.g., a virtual group or log for holding messages and events) or partition (e.g., a subset of a topic). A Kafka broker can be used to generate a Kafka cluster that includes multiple brokers, topics, and partitions that can share information with each other directly or indirectly using a Zookeeper (e.g., a centralized service configured to maintain configuration information, naming, and synchronized distribution within the cluster). As another example, the cell site status collector 204 can be a Kafka producer (aka a Kafka OSS connector) including one or more software applications configured to operate as a data source for the Kafka broker. The Kafka producer can generate messages for one or more topics in the Kafka cluster.

The in-memory processing engine 208 refers to a system that integrates processors with Random Access Memory (RAM) on a single chip. Such processing performed at the RAM can avoid, for example, slow storing of the processed data to a disk drive and enable processing of data in parallel. In-memory processing can be used for analyzing large datasets by pattern detection. The in-memory processing engine 208 can include multiple software applications that are configured to process data. For example, the multiple software applications can be configured to run different logic algorithms to extract different parameters or metrics from data. In the system 200, the in-memory processing engine 208 can receive the cell site status indications configured as broker messages from the broker node 206 and send the messages back to the broker node 206 after processing as processed broker messages. As described with respect to the broker node 206, such interaction between the broker node 206 and the in-memory processing engine 208 can be repeated multiple times.

In some implementations, the in-memory processing engine 208 is an Apache Spark processing engine (also referred to as "Spark"). An Apache Spark is an open-source unified analytics engine for large-scale data processing managed by the Apache Software Foundation. The Apache Spark can perform real-time stream processing or batch processing of data. The Apache Spark is based on a resilient distributed dataset (RDD), which refers to a read-only multiset of data distributed over a cluster of computational machines. The Apache Spark includes a cluster manager (e.g., a graphical user interface (GUI) software) and a distributed storage system (e.g., a file system shared on multiple servers).

The system 200 is in communication with the OSSs 202 via the cell site status collector 204. The OSSs 202 are associated with the telecommunications network so that they operate and manage cell sites of the telecommunications network associated with the system 200. Each OSS 202 can operate and manage multiple cell sites and/or sectors (e.g., a geographical area including a set of cell sites). The OSSs 202 include more than 50, more than 60, more than 70, or more than 80 OSSs that are separate from each other. The OSSs 202 can be operated by different vendors that are separate from the network service provider associated with the system 200. Each vendor can operate one or more OSSs. The OSSs 202 can collect cell site status data from the cell sites. Collection of the cell site status data is described, for example, in U.S. Patent Reference Number U.S. Pat. No. 11,178,559, titled "Cellular Site Monitoring Systems and Methods," by Yun Hong Lee, issued Nov. 16, 2021, content of which is herein incorporated by its entirety.

The system 200 further includes, or is in communication with, the database 216. In some implementations, the database 216 is separate from the in-memory processing engine 208 and/or the broker node 206, while in other implementations the database 216 can be part of, for example, the in-memory processing engine 208. The database 216 can receive processed data from the in-memory processing engine 208 and store the processed data. The processed data can include the cell site status indications from the OSSs 202 that are processed by the system 200 to generate a dataset that enables real-time monitoring of the operational status of the telecommunications network. The dataset can include geographical locations and operational statuses of multiple cell sites of the telecommunications network. The dataset can also include a grouping of the cell site statuses in accordance with geographical areas (e.g., sectors) or technologies (e.g., 2G, 3G, 4G, 5G, 6G, LTE, or narrowband IoT network). In some implementations, the database 216 is further in communication with a computer device 218 and a user interface 220 (e.g., a OneConsole Disaster Recovery (1C DR) Web Interface). The user interface 220 can include a map of a geographical area (e.g., a map of a country such as the United States of America) and representations of coverage areas of various technologies. For example, the coverage areas of the various technologies can be represented with different colors (e.g., 4G is represented with first color and 5G with a second color that is different from the first color). The user interface 220 can further include information regarding operational status of cell sites. For example, the computer device 218 can access or receive the dataset and cause the user interface 220 to display a representation of the dataset. For example, the representation can be a map or a table that indicates the operational status of different cell sites in the network. The user interface 220 can be a display associated with the computer device 218 or a web interface in communication with the computer device 218 via the Internet.

In some implementations, the database 216 is an Elasticsearch database. An Elasticsearch database refers to a search and analytics engine that is based on an Apache Lucene library. The Apache Lucene library refers to an open-source search engine software library. The Elasticsearch database can be configured to provide distributed full text searches using Hypertext Transfer Protocol (HTTP) web interface and JavaScript Object Notation (JSON) documents.

The system 200 can further be in communication with the server 214, which is separate from the in-memory processing engine 208, the broker node 206, and the cell site status collector 204. The server 214 can be configured to provide cell site status indications to the in-memory processing engine 208 directly (e.g., not via the cell site status collector 204 and the broker node 206). The cell site status indications can be collected by systems that are separate from the OSSs 202. In some implementations, the server 214 includes user inputs (e.g., user inputs from field teams at cell sites) detailing the state of technologies and cell sites during build and/or upgrade processes (e.g., to add more capacity or expand technologies). The interaction between the server 214 and the in-memory engine 208 can enable comparison of the assets that are tracked by field teams to what is deployed in the field (e.g., based on the OSS 202 cell status data). The interaction between the server 214 and the in-memory engine 208 can thereby enable monitoring of all assets during the build and upgrade processes.

Figure 3:
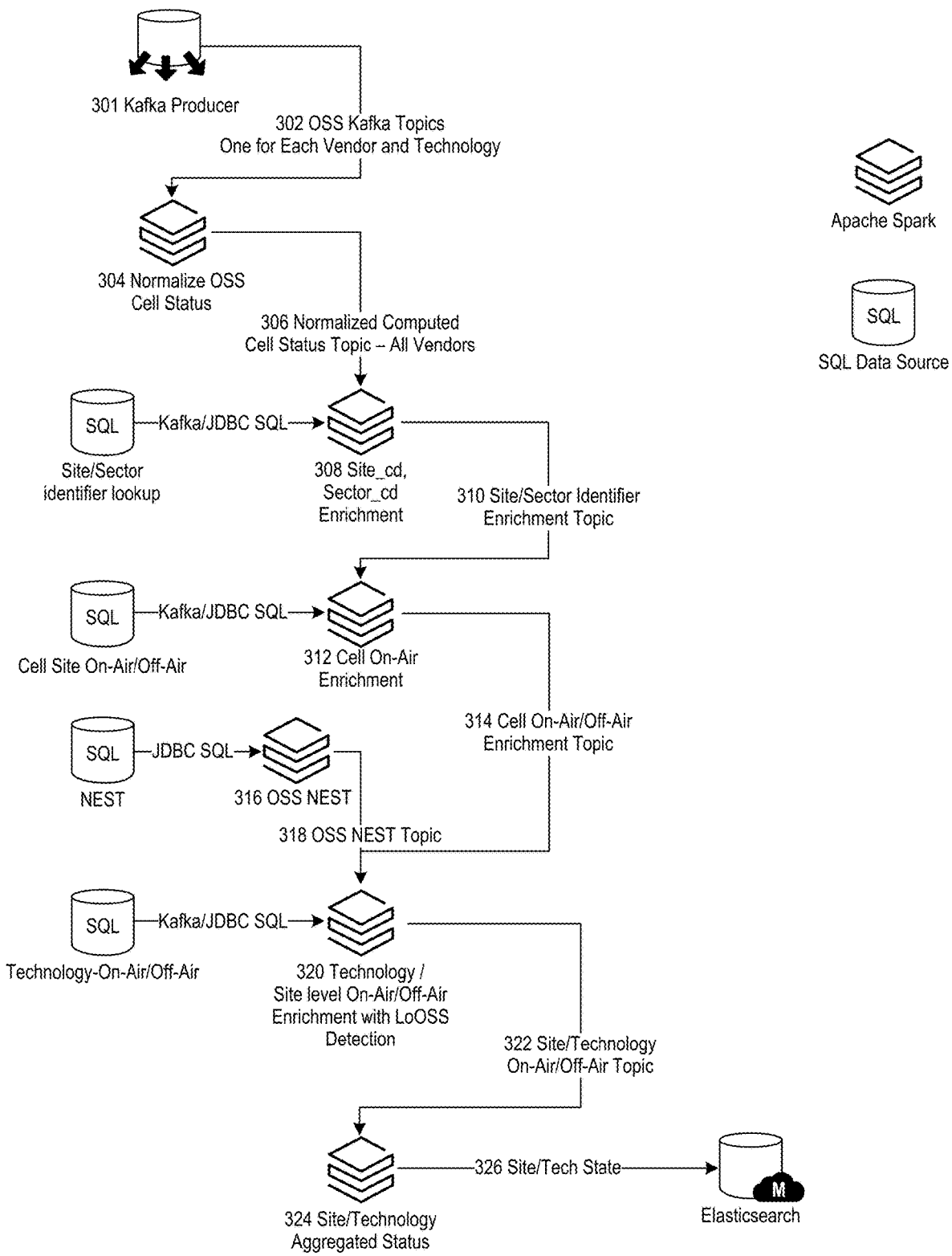
FIG. 3 is a block diagram that illustrates exemplary processes performed by an Apache Spark processing engine and a Kafka broker in a telecommunications network monitoring system.

FIG. 3 is a block diagram that illustrates exemplary processes 300 performed by an Apache Spark processing engine and a Kafka broker (or a Kafka broker cluster) in a telecommunications network monitoring system. In some implementations, the Kafka broker corresponds to the broker node 206 and the Apache Spark processing engine corresponds to the in-memory processing engine 208 described with respect to FIG. 2. For example, the Apache Spark processing engine can include multiple individual software applications (a first software application, a second software application, etc.) that are separate from each other in order to split up the data transformations and to distribute the complexity of the operations while increasing performance. The Kafka broker is used to connect the multiple Apache Spark applications together in a sequence. For example, an application of the Apache Spark processing engine can write data to a Kafka topic on the Kafka broker. The Kafka broker can be configured as a broker cluster that includes multiple topics having specific function and data schema.

The processes 300 also include interactions between a Kafka producer (e.g., corresponding to the cell site status collector 204 in FIG. 2) and the Kafka broker. The Kafka producer can be configured as a cluster that includes multiple Structured Query Language (SQL) elements (e.g., SQL elements described with respect to actions 308 through 320). The SQL elements can write to different Kafka topics on the Kafka broker.

At 301, the Kafka producer can transmit cell status scripts (e.g., Groovy language scripts) via a secure shell (SSH) protocol into each of the OSSs (e.g., the OSSs 202 in FIG. 2) and execute the cell status scripts at the respective OSS. As described with respect to FIG. 2, the collection of the cell site status scripts can be performed in accordance with, for example, U.S. Patent Reference Number U.S. Pat. No. 11,178,559, titled "Cellular Site Monitoring Systems and Methods," by Yun Hong Lee. After the execution of the cell site status scripts, the output can be parsed into a JSON format by the Kafka producer and written as a Kafka message named for the corresponding vendor and technology named Kafka topic.

At 302, each Kafka topic written by the Kafka producers can be named based on the identification of a vendor associated with a respective OSS and a technology. The technology can be selected from 2G, 3G, 4G, 5G, 6G, LTE, or narrowband IoT networks. For example, a Kafka topic can be written in a format of dr.cellstatus_vendor_tech (e.g., dr.cellstatus_ericsson_lte for the vendor Ericsson and the technology LTE).

At 304, a first software application of the Apache Spark can normalize the data from all Kafka topics written at 302 to align with a same column naming standard. A computed cell site status column can be derived by combinations of cell_operational_state_desc, cell_barred_state_desc, and cell_administration_state_desc to identify a faulted status of a cell site. The resulting data frame (e.g., a normalized data) can be written to the Kafka topic at 306. The normalized Kafka topic can contain the most current cell site and/or sector statuses for all vendors and technologies. For example, a normalized Kafka topic can read as dr.compute_sector_state.

At 308, on its initial startup, a second software application of the Apache Spark can read a lookup table containing a cell site code and a sector code (e.g., as site_code and sector_code). The lookup table can be saved in memory for lookup data (e.g., as a SQL site/sector identifier lookup data) and kept up to date by a Java Database Connectivity (JDBC) SQL Kafka producer. The JDBC SQL Kafka producer can detect changes in the lookup data and write the data over to the second software application of the Apache Spark through a Kafka topic. By using a combination of three columns in the Kafka topic as a lookup key (e.g., dr.compute_sector_state), the cell site code and a sector code (e.g., site_code and sector_code) are added to the data frame. The resulting data frame can be written to the Kafka topic at 310. The Kafka topic at 310 contains an enriched topic including site and sector codes for each of the cell sites (e.g., written as dr.cgi_sector_match). Enriched data, as used herein, refers to data collected from multiple outside vendors combined in a single data frame.

At 312, a third software application of the Apache Spark reads in cell site status indicators (e.g., an on-air/off-air data frame) from a site build project tracking tool (e.g., the server 214 in FIG. 2). The site build project tracking tool can be used by site build teams to manage and track life cycle of cell sites. The management can include, for example, upgrading or adding radio frequency (RF) elements at the cell sites. The site build project tracking tool can contain data describing status of cell sites. For example, the data includes which cell sites are supposed to be considered as operating (e.g., on air cell sites), which cell sites are under upgrading or building process, or which cell sites are decommissioned.

The site build project tracking tool can enable that tracking of all assets. For example, during a major outage, the recovery efforts should be focused on operational cell sites rather than cell sites that are non-operational (e.g., under upgrading or building process). The site build project tracking tool can allow the assets to be focused on restoring the most critical cell sites.

The on-air/off-air data frame is queried for all cell sites at the software application start, and updated by a Kafka producer which is detecting the changes in Magenta Built data and generating the changes to be consumed by the third software application of the Apache Spark at 312. Enrichment of the data within the Kafka topic (e.g., dr.cgi_sector_match) can occur using the cell site code and the sector code (e.g., site_cd and sector_cd) to look up whether the cell site is considered on-air or off-air from a site build status. The resulting data frame after the enrichment can be written to the Kafka topic at 314. The Kafka topic at 314 can contain the cell site level build status for each cell site. For example, the Kafka topic can read as dr.sector_sort_match.

At 316, a fourth software application of the Apache Spark takes a list of hostnames of the OSSs and looks up a Network Element State (NEST) to identify whether respective OSSs are in a maintenance mode or in a non-maintenance mode. Generally, maintenance work in the telecommunications network can cause invalid cell site status indications that can lead to false alarms. The NEST can reduce such invalid cell site status indications by identifying cell sites and OSSs that are under maintenance. The cell sites under maintenance can be disregarded from further reporting. The NEST state and OSS hostname can be written to the Kafka topic at 318. The Kafka topic 318 can contain the current NEST state for each of the OSSs configured for the cell site status collection (e.g., as dr.oss_nest).

At 320, a fifth software application of the Apache Spark can further enrich the data (e.g., written as dr.sector_sort_match) with a technology on-air/off-air (e.g., 2G, 3G, 4G, 5G, 6G, LTE, or narrowband IoT network) build status and overall cell site build status (e.g., from a Site On-Air/Off-Air SQL database). A JDBC SQL Kafka producer can update the in-memory cache of the technology and cell site build status lookup tables after the initial startup of the fifth software application at 320 has queried and seeded the cache. The fifth software application can detect cell sites that have not been reported by the cell site status collectors for over a threshold time period (e.g., over 30 minutes, over 1 hour, over 2 hours, or over 5 hours). In response to such a detection, the cell site status is identified with "Loss of OSS" (LoOSS) status. The LoOSS status can indicate that there can be an OSS impairment or the cell sites are decommissioned, in which case they are marked off-air. The cell sites with the LoOSS status can be excluded from the technology and site-level status computation. When a status of an OSS associated with the cell sites is marked as being in a maintenance (e.g., "In Maintenance") and the cell status is noted as LoOSS, the cell site status LoOSS can be changed to "Maintenance of OSS" (MoOSS). Once the cell sites with the cell site status LoOSS or MoOSS report back through the respective OSS, the LoOSS/MoOSS status indication clears and the current cell status along with all build status enrichment is sent to the Kafka topic at 322. At 322, the Kafka topic includes the full enriched data ready for aggregation to the cell site and/or technology level (e.g., as dr.site_sort_match).

At 324, a sixth software application of the Apache Spark can consume all data from the Kafka topic (e.g., dr.site_sort_match) at 322 and update a cached data frame including all of the most recent cell site statuses.

The sixth software application of the Apache Spark can query an Elasticsearch database (e.g., populated by dr.site_sort_match) to retrieve the current full set of cell sites. In some implementations, the Elasticsearch database can correspond to the database 216 in FIG. 2. The Elasticsearch querying at 324 can ensure that all cell site statuses are available for aggregation operations. This can be needed because the cell site status data from the OSSs is not received in a single batch. After the Apache Spark memory processing cache is updated with the latest events from the Kafka topic dr.site_sort_match, the resulting data frame can be aggregated by cell site codes (e.g., site_cd) and the technology to determine cell level statuses for each of the technologies. Following the technology aggregation at 324, the technology status fields can be used to calculate an overall cell site status. If any of the on-air technologies are not reporting from the OSS, a value of "Not Discovered" can be added for that technology to indicate a configuration issue with the cell sites. For example, a cell site can be improperly coded as being on-air for a particular technology when that technology is not built at that cell site.

The resulting data frame can be written to the Kafka topic at 326. The Kafka topic at 326 can include cell site level statuses containing cell site status for each technology and an indication of a market the cell site belongs to. As used herein, a market refers to a geographic space that cell sites fall within. For example, a market can include a city and its vicinity. A market can be associated with an identifier code. A region (e.g., West, East, South, North, Central, North-East) can include multiple markets. The Kafka topic at 326 can be transmitted to the Elasticsearch database to be stored. The Kafka topic from 326 can be used for displaying representations of the cell site status of a telecommunications network (e.g., as described with respect to FIG. 2).

An exemplary site-level status logic including the cell site statuses is illustrated in Table 1. An exemplary sector status logic including operational state, administrative state, and barred state statuses for sectors is illustrated in Table 2.

TABLE 1

Cell Site Status Logic

Sector (orange): Some cells are up
Down (pink): Other technology is up
Down (red): All technology is down
Not Discovered: On Air in Element but not discovered in OSS
LoOSS: No OSS status reported for more than 2 hours
MoOSS: LoOSS but under maintenance in NEST
Locked (pink): Some sectors are locked TABLE 1-continued Cell Site Status Logic Locked (red): All sectors are locked
Barred: The site is barred
Down-Barred: Site is down and barred

TABLE 2

Sector Status Logic

Operational State||Admin State||Barred State|→Sector status
'Up'||'Unlocked'||'UnBarred'|→'UP'
'Down'||'Unlocked'||'UnBarred'|→'DOWN'
'Down'||'Locked'||'UnBarred'|→'LOCKED'
'Down'||'Locked'||'Barred'|→'LOCKED'
'Up'||'Locked'||'Barred'|→'LOCKED'
'Up'||'Locked'||'UnBarred'|→'LOCKED'
'Up'||'Locked'||'RESERVED'|→'LOCKED'
'DOWN'||'Locked'||'RESERVED'|→'LOCKED'
'Up'||'UNLOCKED'||'RESERVED'|→'BARRED'
'Up'||'Unlocked'||'Barred'|→'BARRED'
'Down'||'Unlocked'||'Barred'|→'DOWN-BARRED'
'Down'||'Unlocked'||'RESERVED'|→'DOWN-BARRED'

As shown in Table 1, particular levels or indications of cell site statuses can be associated with a particular color code. Such a color code can be used for the representation of the cell site status in the data. The sector status in Table 2 is an illustration of the cell site status displayed on a user interface (e.g., the user interface 220 in FIG. 2). The sector status can include three different states: operational state, admin state, and barred state. The operational status "UP" refers to a cell site that is configured as operational and is not barred, locked nor reserved. The status "UP" can correspond to a normal operating state where the cell site has power and network connectivity. The operational status "DOWN" refers to a cell site that is not operational. For example, an RF element is not broadcasting due to a power or internet connectivity being disabled or non-operational. The RF element can still be irradiating but without network connectivity a user device (e.g., wireless device) associated with the cell site is unable to make calls or access data services and text messaging. The admin status "LOCKED" refers to a cell site being irradiating but no user device can connect to the cell site (e.g., even to those that are placed on the allow list). For example, no calls can originate or be processed by the user devices. The admin status "UNLOCKED", in contrast, allows connection to the cell site by the user devices. The barred status "BARRED" refers to cell sites that are irradiating but from which the user devices cannot originate calls from. However, calls can be transmitted into a user device with connection to a cell site assigned as "BARRED" when the call originated from an "UNBARRED" cell site. The barred status "RESERVED" refers to a cell site requiring a user device to include a special subscriber identity module (SIM) card for connection.

Figure 4:
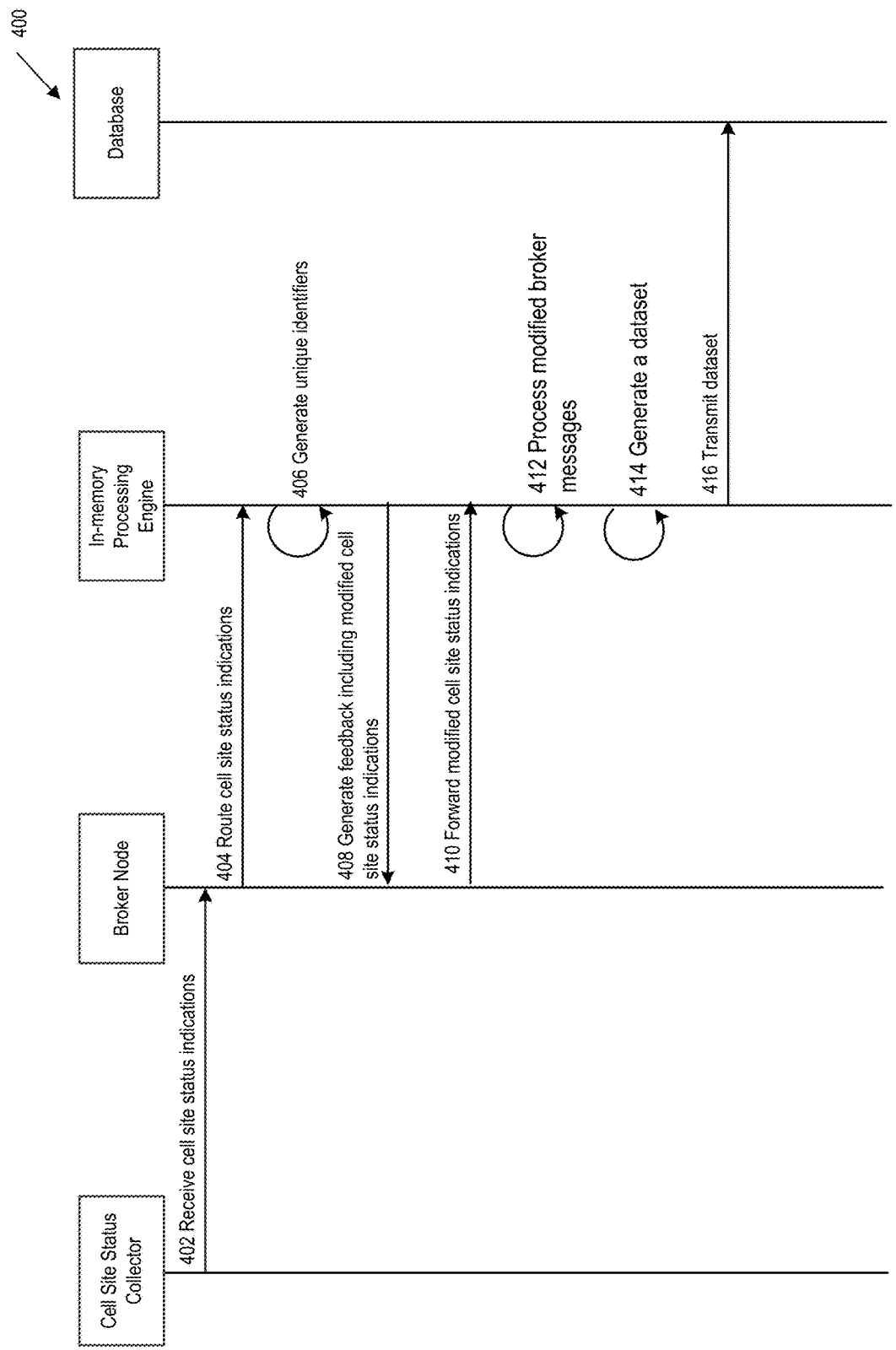
FIG. 4 is a sequence diagram that illustrates processes for monitoring a real-time status of a telecommunications network.

FIG. 4 is a sequence diagram that illustrates processes 400 for monitoring a real-time status of a telecommunications network. The processes 400 can be performed by a telecommunications network monitoring system (e.g., the system 200 in FIG. 2). The system includes a broker node (e.g., the broker node 206 in FIG. 2) and an in-memory processing engine (e.g., the in-memory processing engine 208 in FIG. 2) in communication with each other. In some implementations, the broker node is an Apache Kafka broker and the in-memory processing engine is an Apache Spark processing engine. The system can also include, or be in communication with, a cell site status collector (e.g., the cell site status collector 204 in FIG. 2) and a database (e.g., the database 216 in FIG. 2). The system can be associated with a telecommunications network and include at least one hardware processor and at least one non-transitory memory storing instructions (e.g., as described with respect to a computer system 500 in FIG. 5). When the instructions are executed by the at least one hardware processor, the system performs the processes 400. The system is configured for vendor-agnostic monitoring the real-time operational status of a telecommunications network by processing data, including cell site status indications received from OSSs of different vendors.

At 402, the broker node can receive cell site status indications configured as broker messages from the cell site status collector. The cell site status indications configured as the broker messages can be generated by the cell site status collector. For example, the cell site status collector can receive the cell site status indications from OSSs (e.g., the OSSs 202 in FIG. 2) of the telecommunications network. The cell site status indications can be received in different formats from different OSSs. The cell site status indications can be generated based on parameter data describing the operational statuses of cell sites of respective OSSs.

The parameter data can include multiple parameters that include parameters for identifying cell sites and/or sectors. For example, the parameter data can include first parameter data having cell site identification codes for particular cell sites. The cell site identification codes are unique for each cell site and can, for example, identify a geographical location of the cell site. The parameter data can also include second parameter data, different from the first parameter data, for the particular cell sites. The second parameter data can include a sector identification code associated with a sector. The sector can correspond to a geographical region associated with multiple cell sites. For example, a geographical area serviced by the telecommunications network is divided into multiple sectors and each of the sectors includes multiple cell sites.

The parameter data can also include parameter data that describes current operational statuses of the cell sites. For example, the parameter data can include statuses associated with cell site development. The cell site development can indicate whether certain technologies (e.g., 2G, 3G, 4G, 5G, 6G, LTE, or narrowband IoT network) are implemented or built at a particular cell site. The parameter data can include an operational status of a particular cell site (e.g., whether the cell site is on air or off air). The parameter data can include power alarm status indicating whether a particular cell site is experiencing a power outage or shortage. The parameter data can also include the maintenance or commissioning status of the cell sites.

In some implementations, the OSSs are operated by different vendors. The cell site status indications can include vendor identifications associated with the different vendors. For example, the OSSs 202 in FIG. 2 can include more than 50, more than 60, more than 70, or more than 80 OSSs. These OSSs can be operated by more than one vendor. For example, the OSSs can be operated by two to five different vendors.

In some implementations, the cell site status indications are received by the broker node at least every 5 minutes, at least every 10 minutes, at least every 15 minutes, or at least every 30 minutes. For example, the cell status can be collected every 5 minutes, every 10 minutes, or every 15 minutes. Such frequency of receiving the cell site status indications allows the system to evaluate the operational state of the telecommunications in real time or nearly real time.

At 404, the broker node can route the cell site status indications configured as broker messages to an in-memory processing engine. The in-memory processing engine can include multiple software applications (e.g., the first software application, the second software application, etc., described with respect to FIG. 3). The multiple software applications can include a first software application and a second software application.

At 406, the first software application of the in-memory processing engine can generate unique identifiers that associate each cell site status indication to a particular cell site identification code. The first parameter data of the cell site status indications can be extracted from the cell site status indications (e.g., as described with respect to action 308 in FIG. 3).

In some implementations, the cell site status indications configured as broker messages from the broker node can include lookup tables, and processing the cell site status indications by the first software application to extract the first parameter data can include reading the lookup tables. For example, in FIG. 3 the Apache Spark reads the lookup table including the cell site codes and the sector codes from a lookup data that is saved as SQL site/sector identifier lookup data.

At 408, the first software application of the in-memory processing engine can generate feedback for the broker node including modified cell site status indications. The modified cell site status indications can include the unique identifiers. For example, the Kafka topic at 310 in FIG. 3 includes the cell site and sector codes of each of the cell sites. In some implementations, in response to receiving the modified cell site status indications from the first software application, the broker node can overwrite the cell site status indications at the in-memory processing engine with the modified cell site status indications.

At 410, the broker node forwards the modified cell site status indications to the second software application of the multiple software applications of the in-memory processing engine as modified broker messages. For example, as shown in FIG. 3, different software applications of the Apache Spark process the Kafka topic data in multiple actions from actions 304 through 322.

At 412, the second software application can process the modified broker messages to extract the second parameter data from the modified cell site status indications. The second parameter data can include sector codes or any other parameter data that describes statuses of the cell sites (e.g., as described with respect to actions 308 through 322 in FIG. 3).

At 414, the in-memory processing engine can generate a dataset that includes the second parameter data associated with the unique identifiers. For example, at 324 in FIG. 3, the Apache Spark can consume all data from the Kafka topics from actions 302 through 322 and generate a dataset. The dataset can enable monitoring of the real-time operational status of the telecommunications network. For example, the dataset can enable monitoring of the real-time operational status of the telecommunications network every 5 minutes, every 15 minutes, or every 30 minutes.

At 416, the in-memory processing engine can transmit the dataset to the database (e.g., at 326 in FIG. 3, the Apache Spark transmits the generated dataset to the Elasticsearch database). The database can be separate from the in-memory processing engine and the in-memory processing engine.

The database can store the generated dataset including the most recent status of the telecommunications network.

In some implementations, the generated dataset includes a first sub-dataset and a second sub-dataset. The first sub-dataset and the second sub-dataset are associated with different telecommunications technologies selected from 2G, 3G, 4G, 5G, 6G, LTE, or narrowband IoT networks. The different sub-datasets allow the review of the status of the telecommunications network based on the technologies. For example, in a geographical area, the LTE technology might be experiencing partial or full outage while the 5G technology is fully operational.

In some implementations, the system can cause a computer device (e.g., the computer device 218 in communication with the user interface 220 in FIG. 2) to display a representation of the real-time operational status of the telecommunications network. The representation is based on the generated dataset stored in the database.

In some implementations, the second parameter data can include the sector identification code associated with a sector. In such implementations, the generated dataset can include a sector status indication for multiple sectors that are grouped based on the second identification code.

In some implementations, the parameter data can include additional parameters. Each additional parameter can be processed by additional software applications of the multiple software applications of the in-memory processing engine. Each of the additional parameters can include information associated with the operational statuses of the cell sites (e.g., status associated with cell site development, status associated with power alarm, status associated with maintenance or commissioning, and/or status associated with operations).

In some implementations, the in-memory processing engine can receive additional cell site status indications from an additional server (e.g., the server 214 in FIG. 2) associated with the telecommunications network. The additional cell site status indications are different from the cell site status indications received from the broker node. The in-memory processing engine can process the additional cell site status indications to extract the first parameter data and/or the second parameter data so that the additional cell site status indications can be included in the generated dataset.

Computer System

Figure 5:
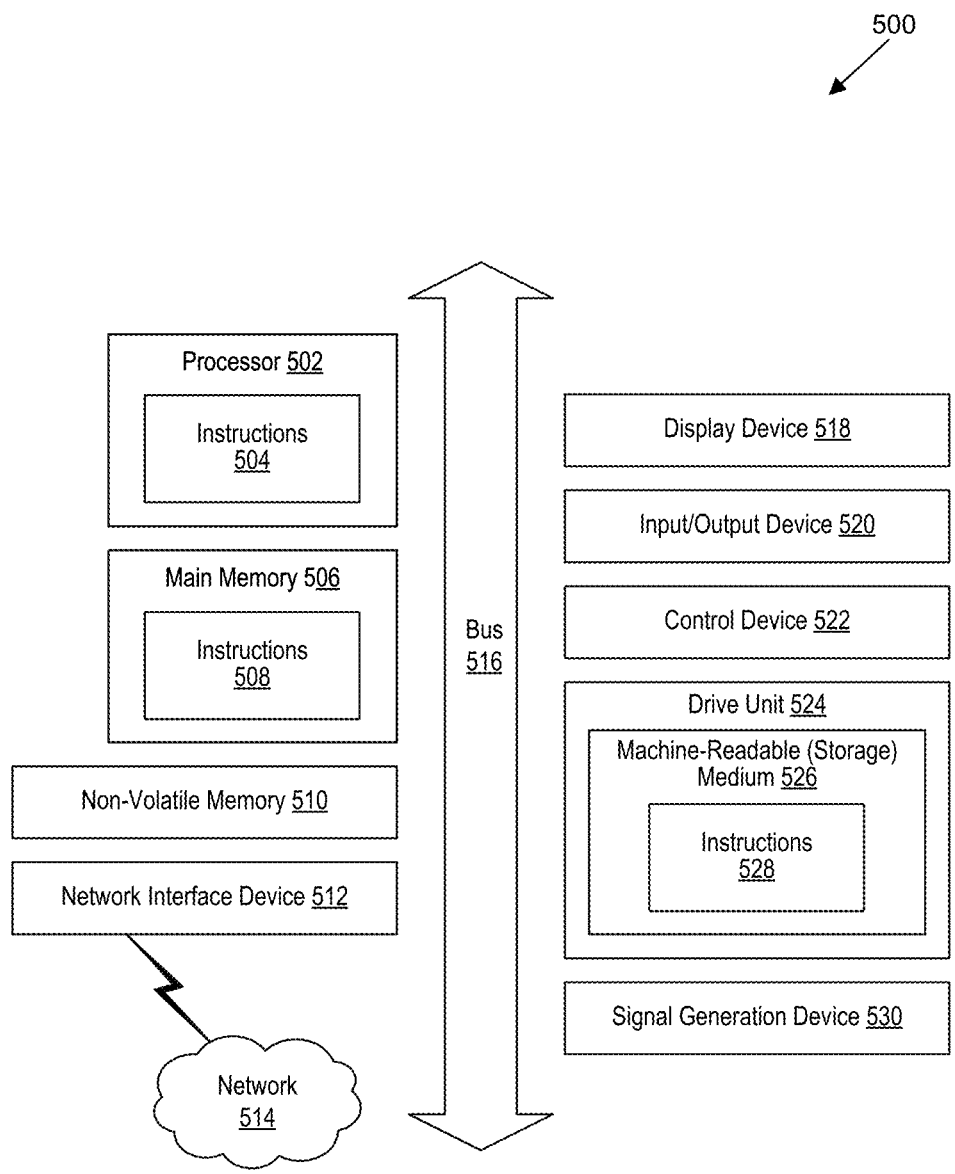
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include one or more processors 502, main memory 506, non-volatile memory 510, a network interface device 512, a video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementation, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real time, in near real time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A computer-implemented method for vendor-agnostic processing of data for monitoring a real-time operational status of a telecommunications network, the method comprising:
    receiving, at a broker node from a cell site status collector, cell site status indications configured as broker messages,
        wherein the cell site status indications are received in different formats from different operations support systems (OSSs) of the telecommunications network,
        wherein the cell site status indications are based on parameter data describing operational statuses of cell sites of respective OSSs, and
        wherein parameter data includes first parameter data having cell site identification codes for particular cell sites and second parameter data for the particular cell sites;
    routing, from the broker node to an in-memory processing engine, the cell site status indications configured as broker messages,
        wherein the in-memory processing engine includes multiple software applications including a first software application and a second software application;
    generating, by the first software application of the in-memory processing engine, unique identifiers that associate each cell site status indication to a particular cell site identification code,
        wherein the first parameter data of the cell site status indications are extracted from the cell site status indications;
    causing the first software application of the in-memory processing engine to generate feedback for the broker node including modified cell site status indications, wherein the modified cell site status indications include the unique identifiers;
    forwarding, by the broker node, the modified cell site status indications to the second software application of the multiple software applications of the in-memory processing engine as modified broker messages;
    processing, by the second software application, the modified broker messages to extract the second parameter data from the modified cell site status indications;
    generating, by the in-memory processing engine, a dataset that includes the second parameter data associated with the unique identifiers,
        wherein the dataset enables monitoring of the real-time operational status of the telecommunications network.

2. The method of claim 1, further comprising:
    storing the generated dataset in a database that is separate from the broker node and the in-memory processing engine; and
    causing display, by a computer device based on the generated dataset stored in the database, a representation of the real-time operational status of the telecommunications network.

3. The method of claim 1, wherein:
    the second parameter data includes a sector identification code associated with a sector,
    the sector corresponds to a geographical region associated with multiple cell sites, and
    the generated dataset includes a sector status indication for multiple sectors that are grouped based on the second identification code.

4. The method of claim 1 further comprising:
    providing, by the cell site status collector to the multiple OSSs, a script including instructions to provide cell site status indicators; and
    in response to executing the script, periodically sending, by the multiple OSSs, the parameter data describing operational statuses of cell sites of respective OSSs to the cell site status collector.

5. The method of claim 1, wherein:
    the parameter data include additional parameters,
    each additional parameter is processes by additional software applications of the multiple software applications of the in-memory processing engine, and
    each of the additional parameters includes information associated with the operational statuses of the cell sites.

6. The method of claim 1, wherein:
    the different OSSs are operated by different vendors and the cell site status indications include vendor identifications associated with the different vendors.

7. The method of claim 1, wherein:
    the cell site status indications configured as broker messages from the broker node include lookup tables, and
    processing the cell site status indications by the first software application to extract the first parameter data includes reading the lookup tables.

8. The method of claim 1, further including:
    in response to receiving the modified cell site status indications from the first software application, overwriting, by the broker node, the cell site status indications at the in-memory processing engine with the modified cell site status indications.

9. The method of claim 1, wherein:
    the cell site status indications are received by the broker node at least every 5 minutes, at least every 15 minutes, or at least every 30 minutes.

10. The method of claim 1, wherein:
    the generated dataset includes a first sub-dataset and a second sub-dataset, and the first sub-dataset and the second sub-dataset are associated with different telecommunications technologies selected from 2G, 3G, 4G, 5G, 6G, LTE, or narrowband Internet of Things (IoT) networks.

11. The method of claim 1, further comprising:
receiving, by the in-memory processing engine from an additional server associated with the telecommunications network, additional cell site status indications that are different from the cell site status indications received from the broker node; and
processing, by the in-memory processing engine, the additional cell site status indications to extract the first parameter data and/or the second parameter data so that the additional cell site status indications can be included in the generated dataset.

12. The method of claim 1, wherein:
the cell site status indications configured as the broker messages are generated by the cell site status collector based on the parameter data describing operational statuses of cell sites of respective OSSs.

13. A computer-implemented method for processing data for monitoring an operational status of a telecommunications network, the method comprising:
routing, from a broker node to an in-memory processing engine, cell site status indications configured as broker messages,
wherein the cell site status indications are based on parameter data describing operational statuses of cell sites associated with telecommunications network, and
wherein parameter data includes first parameter data having cell site identification codes for particular cell sites and second parameter data for the particular cell sites;
wherein the in-memory processing engine includes multiple software applications including a first software application and a second software application;
generating, by the first software application of the in-memory processing engine, unique identifiers that associate each cell site status indication to a particular cell site identification code,
wherein the first parameter data of the cell site status indications are extracted from the cell site status indications;
causing the first software application of the in-memory processing engine to generate feedback for the broker node including modified cell site status indications, wherein the modified cell site status indications include the unique identifiers;
forwarding, by the broker node, the modified cell site status indications to the second software application of the multiple software applications of the in-memory processing engine as modified broker messages;
processing, by the second software application, the modified broker messages to extract the second parameter data from the modified cell site status indications; and
generating, by the in-memory processing engine, a dataset that includes the second parameter data associated with the unique identifiers,
wherein the dataset enables monitoring of the operational status of the telecommunications network.

14. The method of claim 13, wherein:
the cell site status indications are received in different formats at different operations support systems (OSSs) of the telecommunications network.

15. The method of claim 13, further comprising:
storing the generated dataset in a database that is separate from the broker node and the in-memory processing engine; and
causing display, by a computer device based on the generated dataset stored in the database, a representation of the operational status of the telecommunications network.

16. The method of claim 13, wherein:
the dataset enables monitoring of the operational status of the telecommunications network performed in real time based on the cell site status indications received by the broker node at least every 5 minutes, at least every 15 minutes, or at least every 30 minutes.

17. A system including a broker node and an in-memory processing engine for data-agnostic processing for monitoring a real-time operational status of a telecommunications network, the system comprising:
at least one hardware processor; and
at least one non-transitory memory storing instructions, which, when executed by the at least one hardware processor, cause the system to:
receive, at the broker node from a cell site status collector, cell site status indications configured as broker messages,
wherein the cell site status indications are received in different formats at different operations support systems (OSSs) of the telecommunications network,
wherein the cell site status indications are based on parameter data describing operational statuses of cell sites of respective OSSs, and
wherein parameter data includes first parameter data having cell site identification codes for particular cell sites and second parameter data for the particular cell sites;
route, from the broker node to the in-memory processing engine, the cell site status indications configured as broker messages,
wherein the in-memory processing engine includes multiple software applications including a first software application and a second software application;
generate, by the first software application of the in-memory processing engine, unique identifiers that associate each cell site status indication to a particular cell site identification code,
wherein the first parameter data of the cell site status indications are extracted from the cell site status indications;
cause the first software application of the in-memory processing engine to generate feedback for the broker node including modified cell site status indications, wherein the modified cell site status indications include the unique identifiers;
forward, by the broker node, the modified cell site status indications to the second software application of the multiple software applications of the in-memory processing engine as modified broker messages;
process, by the second software application, the modified broker messages to extract the second parameter data from the modified cell site status indications; and
generate, by the in-memory processing engine, a dataset that includes the second parameter data associated with the unique identifiers,
wherein the dataset enables monitoring of the real-time operational status of the telecommunications network.

18. The system of claim 17, wherein:
the broker node is an Apache Kafka broker.

19. The system of claim 17, wherein:
the in-memory processing engine is an Apache Spark processing engine.

20. The system of claim 17, further comprising a database that is separate from the broker node and the in-memory processing engine and a computer device, the system further caused to:
store, by the database, the generated dataset; and
display, by the computer device based on the generated dataset stored in the database, a representation of the real-time operational status of the telecommunications network.

* * * * *